(12) United States Patent
Gamou et al.

(10) Patent No.: US 8,219,978 B2
(45) Date of Patent: Jul. 10, 2012

(54) INFORMATION PROCESSING DEVICE

(75) Inventors: Tsutomu Gamou, Kanagawa (JP);
Hiroyuki Obinata, Kanagawa (JP);
Naoki Tanaka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1418 days.

(21) Appl. No.: 11/561,436

(22) Filed: Nov. 20, 2006

(65) Prior Publication Data
US 2007/0168950 A1    Jul. 19, 2007

(30) Foreign Application Priority Data

Nov. 21, 2005   (JP) .................................. 2005-335625

(51) Int. Cl.
*G06F 9/44*   (2006.01)
*G06F 17/30*  (2006.01)
(52) U.S. Cl. ................. 717/126; 726/4; 726/17; 726/30
(58) Field of Classification Search .................... 717/126
See application file for complete search history.

(56) References Cited

U.S. PATENT DOCUMENTS

| | | | | |
|---|---|---|---|---|
| 5,146,499 | A * | 9/1992 | Geffrotin | 713/172 |
| 5,692,047 | A * | 11/1997 | McManis | 713/167 |
| 5,757,914 | A * | 5/1998 | McManis | 713/187 |
| 5,937,063 | A * | 8/1999 | Davis | 713/187 |
| 5,970,145 | A * | 10/1999 | McManis | 713/187 |
| 6,067,575 | A * | 5/2000 | McManis et al. | 719/313 |
| 6,070,239 | A * | 5/2000 | McManis | 713/187 |
| 6,188,995 | B1 * | 2/2001 | Garst et al. | 705/59 |
| 6,463,537 | B1 * | 10/2002 | Tello | 713/182 |
| 6,546,487 | B1 * | 4/2003 | McManis | 713/169 |
| 6,590,597 | B1 * | 7/2003 | Kim | 715/866 |
| 7,003,672 | B2 * | 2/2006 | Angelo et al. | 713/189 |
| 7,225,430 | B2 * | 5/2007 | Eatough et al. | 717/127 |
| 7,664,949 | B2 * | 2/2010 | England et al. | 713/156 |
| 2002/0025141 | A1 * | 2/2002 | Matsumoto et al. | 386/96 |
| 2002/0049909 | A1 * | 4/2002 | Jackson et al. | 713/188 |
| 2002/0133804 | A1 * | 9/2002 | Sheedy | 717/106 |
| 2003/0033203 | A1 * | 2/2003 | Inoue et al. | 705/14 |
| 2003/0056107 | A1 * | 3/2003 | Cammack et al. | 713/189 |
| 2003/0061487 | A1 * | 3/2003 | Angelo et al. | 713/176 |

(Continued)

FOREIGN PATENT DOCUMENTS

JP       10-333902 A       12/1998

(Continued)

OTHER PUBLICATIONS

Ravi et al., "Tamper Resistance Mechanisms for Secure Embedded Systems", © 2004 IEEE, retrieved from <http://ieeexplore.ieee.org/stamp/stamp.jsp?tp=&arnumber=1260985>, total pp. 7.*

(Continued)

*Primary Examiner* — Don Wong
*Assistant Examiner* — Marina Lee
(74) *Attorney, Agent, or Firm* — Matthew B. Dernier, Esq.; Gibson & Dernier LLP

(57) ABSTRACT

Methods and apparatus include: providing a computer having a program execution module for carrying out a process according to a program; providing an execution control module, connected to the program execution module; carrying out mutual authentication, within the execution control module, with respect to the program execution module; carrying out a process for authentication relative to an object program for execution by the program execution module; and preventing the program execution module from executing the object program until the object program is successfully authenticated.

10 Claims, 3 Drawing Sheets

U.S. PATENT DOCUMENTS

| | | | |
|---|---|---|---|
| 2003/0114144 A1* | 6/2003 | Minemura | 455/410 |
| 2003/0160823 A1* | 8/2003 | Stannard | 345/764 |
| 2004/0172544 A1* | 9/2004 | Luo et al. | 713/189 |
| 2005/0120245 A1 | 6/2005 | Torisaki et al. | |
| 2005/0232595 A1* | 10/2005 | Hirai | 386/94 |
| 2006/0020810 A1* | 1/2006 | Waltermann et al. | 713/179 |
| 2006/0212854 A1* | 9/2006 | Borges et al. | 717/140 |
| 2006/0215995 A1* | 9/2006 | Tada | 386/95 |
| 2006/0288235 A1* | 12/2006 | Goto | 713/190 |
| 2007/0038589 A1* | 2/2007 | Brockhaus et al. | 707/1 |
| 2007/0168950 A1* | 7/2007 | Gamou et al. | 717/116 |
| 2007/0209077 A1* | 9/2007 | Kitani | 726/26 |

FOREIGN PATENT DOCUMENTS

| | | |
|---|---|---|
| JP | 2003-283417 A | 8/2003 |
| JP | 2003-223235 A | 10/2003 |
| JP | 2005-157930 A | 6/2005 |

OTHER PUBLICATIONS

Office Action for corresponding Japanese Patent Application 2005-335625, dated: Dec. 22, 2009.

Office Action for corresponding Japanese Patent Application 2005-335625, dated: Apr. 20, 2010.

* cited by examiner

FIG.5

PROGRAM : aaaa

| VERSION | PERMISSION/REJECTION |
|---------|----------------------|
| 1.0 | REJECT |
| 1.1 | PERMIT |
| ⋮ | ⋮ |

INFORMATION PROCESSING DEVICE

BACKGROUND OF THE INVENTION

1. Field of the Invention

The present invention relates to an information processing device which operates according to a program, and a program execution control method employed by the same.

2. Description of the Related Art

In recent years, problems have emerged with information processing devices, including one in which a party without valid authority executes a program subjected to falsification to cause information to be disseminated contrary to the user's intention.

Some information processing devices may aim to execute only a program having a valid license granted, and even among those programs having valid licenses granted, there are some programs which ought to be prevented from being executed by an information processing device other than a legitimate information processing device while utilizing software such as an emulator, or the like.

For these purposes, some conventional methods are available, such as is disclosed in U.S. Pat. No. 5,937,063, or the like, including one in which a program is encoded in advance and decoded later on the processor side for execution.

Another method may be such that a hash value issued in advance for each program is stored at the time of activation of the program, so that a processor serving as a program execution module authenticates a program to be executed while referring to the stored hash value.

However, according to the above-described conventional method, as the entity for program execution and that for decoding and verification are the same, a situation cannot be handled in which the program for decoding and verification is exchanged with an illegal one. Also, according to the method using a stored hash value, a problem remains unsolved as to how to securely hold a hash value of a program to be developed after production of the product.

SUMMARY OF THE INVENTION

The present invention has been conceived in view of the above described situation, and one of the objects of the present invention is to provide an information processing device capable of verifying all programs to be executed by a program execution subject and authenticating a program to be developed after the production, and a program execution control method employed by the same.

In order to address the above-described problem of the related art, according to the present invention, there is provided an information processing device comprising a program execution module for carrying out a process according to a program, and an execution control module, connected to the program execution module, for carrying out mutual authentication with respect to the program execution module, for carrying out a process for authentication relative to an object program for execution by the program execution module, and for controlling the program execution module so as to refrain from executing the object program until the object program is successfully authenticated.

BRIEF DESCRIPTION OF THE DRAWINGS

FIG. 5 is a diagram explaining an example of permission/rejection information for use by the information processing device according to the embodiment of the present invention.

DESCRIPTION OF THE PREFERRED EMBODIMENTS

Figure 1:
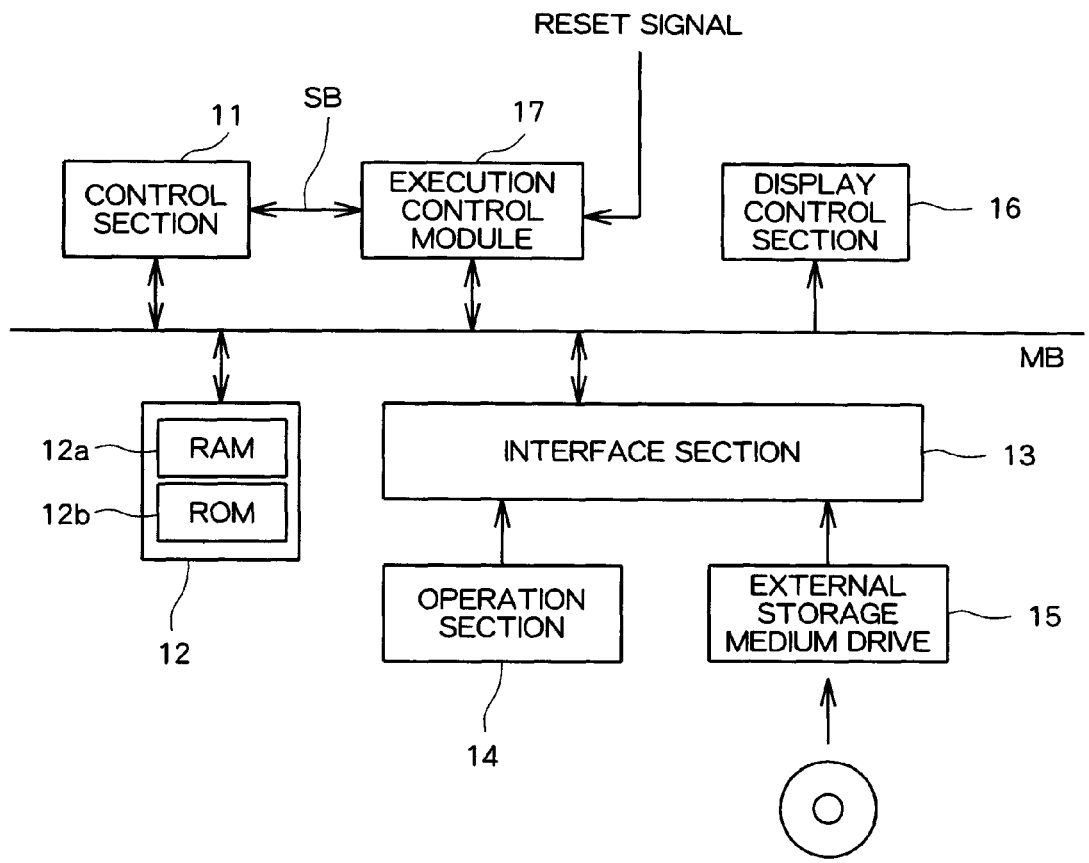
FIG. 1 is a block diagram showing an example of a structure of an information processing device according to an embodiment of the present invention.

An embodiment of the present invention will be described while referring to the accompanying drawings. The information processing device 1 according to an embodiment of the present invention is constructed, as shown in FIG. 1, comprising a control section 11, a storage section 12, an interface section 13, an operation section 14, an external storage medium drive 15, a display control section 16, and an execution control module 17. Among these structural elements, the control section 11, the storage section 12, the interface section 13, the display control section 16, and the execution control module 17 are mutually connected via a main bus MB. In addition, the control section 11 and the execution control module 17 are also connected via a secure bus SB.

The control section 11 is a program execution module, such as a CPU, or the like, which operates according to a program. Specifically, the control section 11 operates here according to a program stored in the storage section 12 or the external storage medium drive 15. In this embodiment, the control section 11 executes only a program with permission granted by the execution control module 17 as for execution thereof. An operation of the control section 11 will be described later. Further, the control section 11 also operates as a bus master of the main bus MB. Still further, the control section 11 has a controller for the secure bus SB and holds key information for mutual authentication.

The storage section 12 is constructed comprising a storage medium such as a RAM 12a, ROM 12b, or the like. Here, the RAM 12a stores a program read by the external storage medium drive 15. The RAM 12a operates also as a work memory of the control section 11. The ROM 12b holds a program which is necessary in activation of the information processing device 1 (for example, BIOS (Basic Input Output System) or the like), a parameter, or the like.

The interface section 13 is connected to the control section 11, the operation section 14, the external storage medium drive 15, and the execution control module 17, and outputs a signal output from the operation section 14 to the control section 11. The interface section 13 also outputs an instruction input from the control section 11 to the external storage medium drive 15, and also data input from the external storage medium drive 15 to the execution control module 17.

The operation section 14 is a keyboard, a mouse, a game controller, or the like, and outputs the content of an operation instruction carried out by the user, via the interface section 13 to the control section 11. According to an instruction input via the interface section 13, the external storage medium drive 15 reads data from an external storage medium such as a DVD, Blu-ray Disc, or the like, and outputs via the interface section 13 to the execution control module 17.

The display control section 16 is connected to a display, a TV receiver, or the like, and according to an instruction input from the control section 11, produces and outputs an image to be shown in a display or the like.

Figure 2:
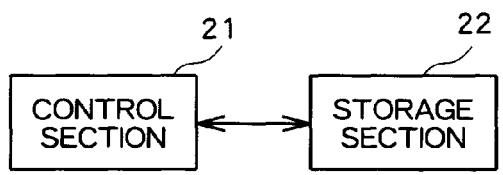
FIG. 2 is a block diagram showing a structure of an example of an execution control module according to the embodiment of the present invention.

The execution control module 17, while carrying out a process for authenticating a program to be executed by the control section 11 (an object program), controls the control section 11 so as to refrain from executing the object program until authentication of the object program is successfully completed. As shown in FIG. 2, the execution control module 17 is constructed comprising a control section 21 and a storage section 22. Here, it should be noted that the control section 21 is a micro computer, or the like, and executes a program stored in the storage section 22. The storage section 22 stores a program to be executed by the control section 21 (a mutual authentication program, a signature verification program, and a decoding program), and a parameter. Operation of the execution control module 17 will be described later.

Figure 3:
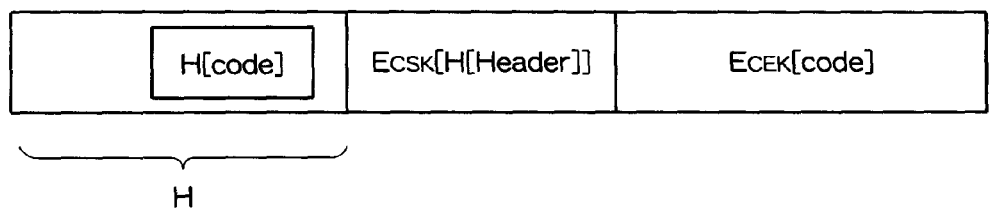
FIG. 3 is a diagram explaining an example of a data structure of a program, when stored, to be executed by the information processing device according to the embodiment in the present invention.

The programs to be executed by the control section 11 of the information processing device 1 in this embodiment are classified into a plurality of kinds, including (1) a program, such as a BIOS, or the like, to be executed at the time of activation, (2) a program, such as a loader, for loading a system, (3) a system, such as an OS (Operating System) (system program), and (4) application programs, such as games, a word processors, or the like. Each of the programs is encoded, and stored as data having a structure such as is shown in FIG. 3 in the storage section 12 or an external storage medium. That is, a program to be executed by the control section 11 of the information processing device 1 in this embodiment is constructed comprising an encoding code portion (ECEK[code]), which is a code portion encoded, a header portion H, and a signature information portion (ECSK [H[Header]), which is a hash value of the header portion H (H[Header]) being encoded using a signature key CSK. It should be noted that the header portion H contains the hash value (H[code]) of the code portion.

Here, it should be noted that the signature key CSK is a private key secretly held by an organization which issues a license of the program and issued together with a public key CVK corresponding to the private key. The public key CVK is stored in the storage section 22 in the execution control module 17.

In the following, operation of the control section 11 and the execution control module 17 will be described.

Figure 4:
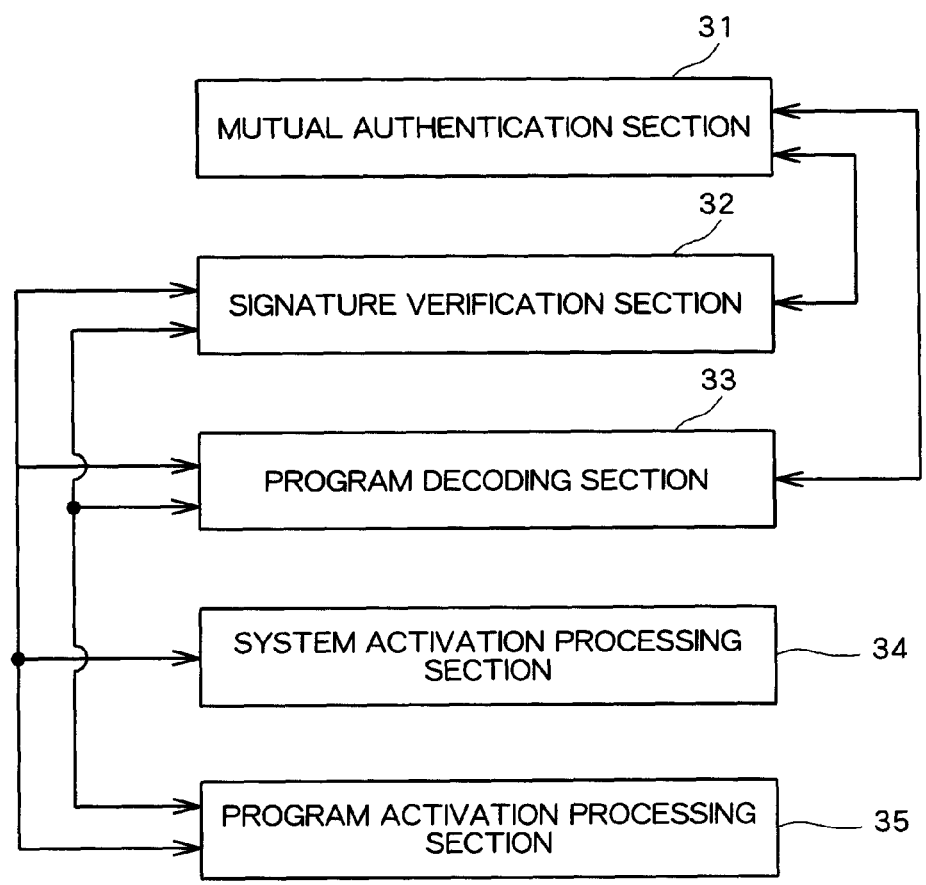
FIG. 4 is a functional block diagram of an execution control module of the information processing device according to the embodiment of the present invention.

It should be noted that it is assumed in the description below that a public key CVK corresponding to the signature key CSK and a decoding key CEK for use in decoding the encoding code portion of a program are stored in the storage section 22 in the execution control module 17. Also, the storage section 22 holds a mutual authentication program, a signature verification program, and a decoding program, all to be executed by the control section 21. The control section 21 is constructed, by carrying out these programs, comprising, in terms of functions, a mutual authentication section 31, a signature verification section 32, a program decoding section 33, a system activation processing section 34, and a program activation processing section 35, as shown in FIG. 4.

The control section 21 of the execution control module 17 is activated upon receipt of a reset signal input when power supply is turned on, and begins execution of the mutual authentication program, whereby the execution control module 17 begins a process to be carried out by the function as the mutual authentication section 31. The process to be carried out by the mutual authentication section 31 will be described later.

The signature verification section 32 calculates the hash value of the header portion H contained in a program for processing to thereby obtain an operation hash value, and decodes the data contained in the signature information portion, using a public key CVK to thereby obtain a signature hash value. Then, a determination is made as to whether or not the operation hash value and the signature hash value are coincident with each other, and the result of the determination is output.

The program decoding section 33 decodes the encoding code portion contained in the program for processing, using the decoding key CEK to thereby obtain the code of the program, and outputs the obtained code.

In the following, operation of the mutual authentication section 31 will be described.

At the time when the mutual authentication section 31 begins operating, the control section 11 is yet to be activated and thus does not operate as the bus master of the main bus MB. Therefore, communication via the main bus MB cannot be carried out. Instead, the execution control module 17 carries out communication via the secure bus SB with respect to the control section 11.

The mutual authentication section 31 reads a mutual authentication program from the storage section 22. The mutual authentication program also has a data structure such as is shown in FIG. 3, and may be authenticated by the signature verification section 32. The mutual authentication section 31 obtains key information for mutual authentication via the secure bus SB from the control section 11. The mutual authentication section 31 carries out authentication, using the key information for mutual authentication obtained from the control section 11. A detailed description of the method for mutual authentication is omitted here as a widely known method, such as a pre-shared key method, for example, may be used.

When mutual authentication fails, the mutual authentication section 31 suspends the ongoing processing. In this case, the control section 11 is not activated, so that activation of the system is substantially blocked.

On the other hand, when mutual authentication is successfully completed, the mutual authentication section 31 instructs the system activation processing section 34 to activate the system by outputting a reset signal to the control section 11, thus activating the control section 11. When the reset signal is then output to the control section 11, communication among the respective sections via the main bus MB becomes possible.

The system activation processing section 34 carries out a process to cause the control section 11 to execute a program to be executed at the time of activation, such as BIOS, or the like, and a loader for reading an OS. It is assumed here that the program to be executed at the time of activation, such as BIOS, or the like, and a loader program are stored in the ROM 12b of the storage section 12. The system activation processing section 34 reads a BIOS program from the ROM 12b of the storage section 12. The BIOS program also has a data structure such as is shown in FIG. 3. The system activation processing section 34 outputs the BIOS program as a program for processing to the signature verification section 32. Then, when it is determined from the result of determination output from the signature verification section 32 that the operation hash value does not coincide with the signature hash value (that is, authentication fails), the ongoing processing is suspended. In this case, the information processing device 1 is not activated.

On the other hand, when the operation hash value coincides with the signature hash value (that is, authentication completes successfully), the BIOS program for processing is output to the program decoding section 33. The program decoding section 33 outputs a program code restored through decoding, which is then stored in the storage section 12.

It should be noted here that the address in the storage section 12, at which to store the code is the area where the program to be executed by the control section 11 at the time of activation is held.

Thereafter, the system activation processing section 34 outputs a reset signal to the control section 11 to thereby activate the control section 11.

The control section 11 begins BIOS processing. In the case where a program of the device driver for the external storage medium drive 15 is contained in the BIOS, for example, initiation of the BIOS process by the control section 11 enables reading of the program from the external storage medium drive 15.

The system activation processing section 34 reads the loader program from the ROM 12b of the storage section 12. The loader program also has a data structure such as is shown in FIG. 3. The system activation processing section 34 outputs the loader program as a program for processing to the signature verification section 32. When it is determined from the result of determination output from the signature verification section 32, that the operation hash value does not coincide with the signature hash value (that is, authentication fails), the ongoing processing is suspended. In this case, the information processing device 1 is not substantially activated as a program for reading a program is not executed, though the BIOS program is ready for execution.

On the other hand, when the operation hash value coincides with the signature hash value (authentication completes successfully), the loader program for processing is output to the program decoding section 33, and the program code restored through decoding, which is output from the program decoding section 33, is stored in the storage section 12. Thereafter, the system activation processing section 34 causes the control section 11 to begin execution of the program code (for example, setting an interrupt vector at the head address of the storage section 12 where the loader program is stored, and outputting an interrupt signal).

With the above, the control section 11 begins execution of the loader program. Suppose here that the loader program is a program for reading a program from an external storage medium set in the external storage medium drive 15. The control section 11 instructs the external storage medium drive 15 to read a program. In response, the external storage medium drive 15 reads a program from the external storage medium set therein and outputs to the execution control module 17. It is assumed here that the operation system (OS) and an application program to be executed under control by the OS are stored in the external storage medium.

The external storage medium drive 15 initially reads an OS stored in the boot sector (an area from which data is stored to be read at the time of activation) of the external storage medium, and outputs to the execution control module 17. The program for the OS read here also has a data structure such as is shown in FIG. 3. The program activation processing section 35 outputs the OS program as a program for processing to the signature verification section 32. Then, when it is determined from the result of verification, which is output from the signature verification section 32, that the operation hash value does not coincide with the signature hash value (authentication fails), the ongoing processing is suspended, and the OS is not activated.

On the other hand, when it is determined that the operation hash value coincides with the signature hash value (authentication completes successfully), the OS program for processing is output to the program decoding section 33. The program decoding section 33 outputs a program code restored through decoding, which is then stored in the storage section 12. Thereafter, the program activation processing section 35 causes the control section 11 to initiate execution of the program code (for example, setting an interrupt vector to the head address of the storage section 12 where the program for the OS is stored, and outputting an interrupt signal). With the above, the control section 11 begins processing as an OS.

It should be noted here that the OS executes a shell program (shell program; a launcher for activating an application program) as a command program, which also has a structure such as is shown in FIG. 3 and is to be authenticated by the execution control module 17. When the authentication completes successfully, the code portion is decoded and supplied to be executed by the control section 11.

Further, with the user's operation relative to the shell program to instruct activation of an application program, the control section 11 instructs the external storage medium drive 15 to read an application program. In response, the external storage medium drive 15 reads the application program stored in the external storage medium, and outputs to the execution control module 17.

The application program read here also has a data structure such as is shown in FIG. 3. The program activation processing section 35 outputs the application program as a program for processing to the signature verification section 32. Here, when it is determined from the result of determination output from the signature verification section 32, that the operation hash value does not coincide with the signature hash value (authentication fails), the ongoing processing is suspended, and the application program is not activated.

On the other hand, when it is determined that the operation hash value coincides with the signature hash value (authentication completes successfully), the application program for processing is output to the program decoding section 33. The program decoding section 33 outputs the program code restored through decoding, which is then stored in the storage section 12. The program activation processing section 35 causes the control section 11 to initiate execution of the program code (for example, setting an interrupt vector at the head address of the storage section 12 where the application program is stored, and outputting an interrupt signal). With the above, the control section 11 begins processing according to the application program.

As described above, in this embodiment, control is performed such that while a process for authentication is carried out relative to an object program for execution by the control section 11 serving as a program execution mode, the control section 11 refrains from executing the object program until the object program is successfully completed.

It should be noted that the data to be exchanged between the control section 11 and the execution control module 17 (information such as the head address or the like of a program to be executed) may be encoded. In this case, the control section 11 has an encoder-decoder for encoding and decoding data, and carries out decoding of the encoded data and setting of an interrupt vector, or the like. The execution control module 17 also has an encoder-decoder, and encodes data to be output to the control section 11 before output.

It should be noted that, in the above description, different encoding keys for use in encoding of a code portion may be used for each of the plurality of kinds, such as (1) a program, such as a BIOS, or the like, to be executed at the time of activation, (2) a program, such as a loader, for loading a system, (3) a system, such as an OS (Operating System)

(system program), and (4) application programs, such as games, word processors, or the like. In this case, a decoding key for each program kind is stored in the storage section 12 of the execution control module 17.

Then, the program decoding section 33 determines the kind of the program for processing, and reads a decoding key corresponding to the result of the determination from the storage section 12. The code portion is then decoded using the decoding key read. It should be noted that the kind determination may be carried out while referring to information for specifying the kind, which is contained in advance in the header information of the program.

In this embodiment, the execution control module 17 obtains, for each program for execution, permission/rejection information indicating whether or not execution of a program of each version is permitted, and when execution of a program of the version identical to the version of the object program is permitted according to the permission/rejection information, the object program is authenticated and decoded so that execution by the control section 11 is permitted.

In this case, the permission/rejection information may be stored in the ROM 12b of the storage section 12. The permission/rejection information contains, for every program, version information and a flag both arranged in association with each other, as shown in FIG. 5, for example, with the flag indicating whether or not activation of each version is permitted.

Upon receipt of an input of a program for execution which is read from the external storage medium drive 15, the execution control module 17 reads the permission/rejection information from the storage section 12. Then, the version of the input program is determined based on, for example, the header information of the program. Then, while referring to the permission/rejection information relevant to the program, whether or not execution of the determined version is permitted is determined.

Here, when it is determined that the execution is not permitted, the ongoing processing is suspended. On the other hand, when it is determined that the execution is permitted, a process for authentication is carried out. This arrangement enables individual access control for each version.

In this embodiment, it is possible to verify all programs for execution by the control section 11 serving as an entity for program execution. It should be noted that all programs as referred to here include a program for mutual authentication, a system program such as BIOS, or the like.

Further in this embodiment, the control section 11 does not actually need to be activated in authenticating these system programs. For example, the operation of the control section 11 may be temporarily suspended after mutual authentication (suspension of clock input and/or power supply).

Also, as it is unnecessary to hold in advance a hash value relevant to a program, it is possible to authenticate a program to be developed after the production. Further, as the authentication key for use in authentication by the execution control module 17 is a public key, even though the data in the execution control module 17 is illegally read, it is practically impossible to produce illegally a programs which are authenticated by the execution control module 17. It should be noted that the execution control module 17 may be accommodated in a tamper resistant hardware package. A method for producing a tamper resistant hardware package is not described in detail here as various widely known methods can be employed including one in which memory content is erased upon opening of the package.

Further, although it is described in the above that the control section 11 and the execution control module 17 are contained in different packages and connected to each other via a bus or the like (mutual authentication and exchanging data encoding are employed because of this arrangement), the control section 11 and the execution control module 17 may be accommodated in the same package.

While the present invention is described in terms of preferred or exemplary embodiments, it is not limited hereto.

What is claimed is:

1. An information processing device, comprising:
   a main bus operable to provide communications within the processing device;
   a program execution module for carrying out a process according to a program; and
   an execution control module connected to the program execution module via a bus, where the bus is different from the main bus, and the execution control module including a storage section which holds a mutual authentication program to be carried out by the execution control module, the execution control module being operable to:
   (i) carry out mutual authentication with the program execution module over the bus,
   (ii) carry out a process for authentication relative to an object program for execution by the program execution module,
   (iii) prevent the program execution module from executing the object program until the object program is successfully authenticated, and
   (iv) control the main bus of the device such that communications via the main bus only become possible when the mutual authentication carried out by the mutual authentication program between the execution control module and the program execution module via the bus has succeeded.

2. The information processing device according to claim 1, wherein:
   the object program has been encoded; and
   the execution control module is operable to decode the object program when it has been successfully authenticated, and to supply the object program to the program execution module for use in the process.

3. The information processing device according to claim 2, wherein: the object program is classified into any of a plurality of predetermined types; and
   the execution control module is operable to: (i) store a decoding key, each key for one or more of the predetermined types of object program, and (ii) decode the object program using the decoding key corresponding to the type object program.

4. The information processing device according to claim 1, wherein the execution control module is operable to:
   obtain permission/rejection information for each program, the permission/rejection information indicating whether or not execution of a particular version of the program is permitted; and
   cause the program execution module to execute the object program when the permission/rejection information indicates that a given program, having a version identical to a version of the object program, is permitted to be executed.

5. A program execution control method, comprising:
   providing a computer having a program execution module for carrying out a process according to a program;
   providing an execution control module, connected via a bus to the program execution module;
   mitigating communication via a main bus of the computer prior to mutual authentication of the execution control module with the program execution module, the main bus being different from the bus;

carrying out the mutual authentication, within the execution control module, of the execution control module with the program execution module via the bus;

carrying out a process for authentication relative to an object program for execution by the program execution module;

controlling the main bus such that communication via the main bus of the computer only becomes possible when the mutual authentication carried out by the mutual authentication program between the execution control module and the program execution module via the bus has succeeded; and preventing the program execution module from executing the object program until the object program is successfully authenticated.

6. The method of claim 5, wherein the bus is a secure bus that exclusively connects the execution control module with the program execution module.

7. The method of claim 6, further comprising, activating the program execution module and the computer only if the mutual authentication is successfully completed.

8. The method of claim 6, further comprising, suspending activation of the computer having the program execution module if the mutual authentication fails.

9. The information processing device according to claim 1, wherein the bus is a secure bus connecting only the program execution module and the execution control module, wherein the secure bus is disparate from the main bus interconnecting all components of the information processing device.

10. The information processing device according to claim 1, wherein the execution control module is operable to control the main bus such that communications via the main bus only become possible by beginning to operate as a bus master of the main bus when the mutual authentication carried out by the mutual authentication program between the execution control module and the program execution module via the bus has succeeded.

* * * * *